United States Patent [19]
Ledonne et al.

[11] 4,127,141
[45] Nov. 28, 1978

[54] METHOD AND APPARATUS FOR STOPPING FLUID ESCAPE FROM PIPE MAINS

[75] Inventors: Alfred D. Ledonne, Allison Park; George A. Scheuering, Pittsburgh, both of Pa.

[73] Assignee: Coupling Systems, Inc., Pittsburgh, Pa.

[21] Appl. No.: 801,650

[22] Filed: May 31, 1977

[51] Int. Cl.² .................. F16L 55/12; F16K 43/00
[52] U.S. Cl. .................................. 137/15; 137/315; 137/318; 137/321; 138/89; 138/94; 138/97
[58] Field of Search ............... 137/318, 319, 315, 320, 137/321, 322, 15; 138/94, 94.3, 97, 89

[56] References Cited
U.S. PATENT DOCUMENTS

| | | | |
|---|---|---|---|
| 987,145 | 3/1911 | Leisinger | 138/89 |
| 2,002,383 | 5/1935 | Witt | 138/94 X |
| 2,390,461 | 12/1945 | Racz | 138/89 |
| 2,482,687 | 9/1949 | Mueller et al. | 138/89 |
| 2,763,282 | 9/1956 | Reedy et al. | 138/94 |
| 2,780,244 | 2/1957 | Lee | 138/94 |
| 2,899,983 | 8/1959 | Farris | 138/94 |
| 3,476,358 | 11/1969 | Westerlund et al. | 251/214 |
| 3,773,067 | 11/1973 | Racj | 137/318 |
| 3,799,182 | 3/1974 | Long | 138/94 |
| 3,995,655 | 12/1976 | Sands | 137/318 |

FOREIGN PATENT DOCUMENTS 1,334,210  10/1973  United Kingdom .......... 138/89

*Primary Examiner*—Martin P. Schwadron
*Assistant Examiner*—G. L. Walton
*Attorney, Agent, or Firm*—Buell, Blenko & Ziesenheim

[57] ABSTRACT

A method and apparatus are provided for sealing the opening in the sidewall of a fluid carrying main during replacement of a service tee or the like comprising a gate valve, means on end of said gate valve for engaging the end of a service tee remote from the main, a plug wrench having an elongate stem adapted to pass through said gate valve in the open position, closure means on the other end of said gate valve having a passage adapted to sealingly and slidably pass said stem through the gate valve to remove a screw plug in the end of the service tee remote from the main and to receive the screw plug and wrench above the gate valve while the gate valve is closed, a stopper rod interchangeable with the elongate stem of the plug wrench in the passage in the closure means, said stopper rod having an axial passage, a resilient elongate member abutting one end of said stopper rod, an intermediate hollow shaft threaded in the hollow passage of the stopper rod and extending through the resilient member to expand the plug radially on relative rotation with respect to the stopper rod, a threaded jack shaft extending through and threadingly engaging the hollow intermediate shaft and through the resilient member whereby on relative rotation of the jack member and the stopper rod, the expanded resilient member is raised into engagement with the wall of the main around the opening therein to seal the same.

12 Claims, 6 Drawing Figures

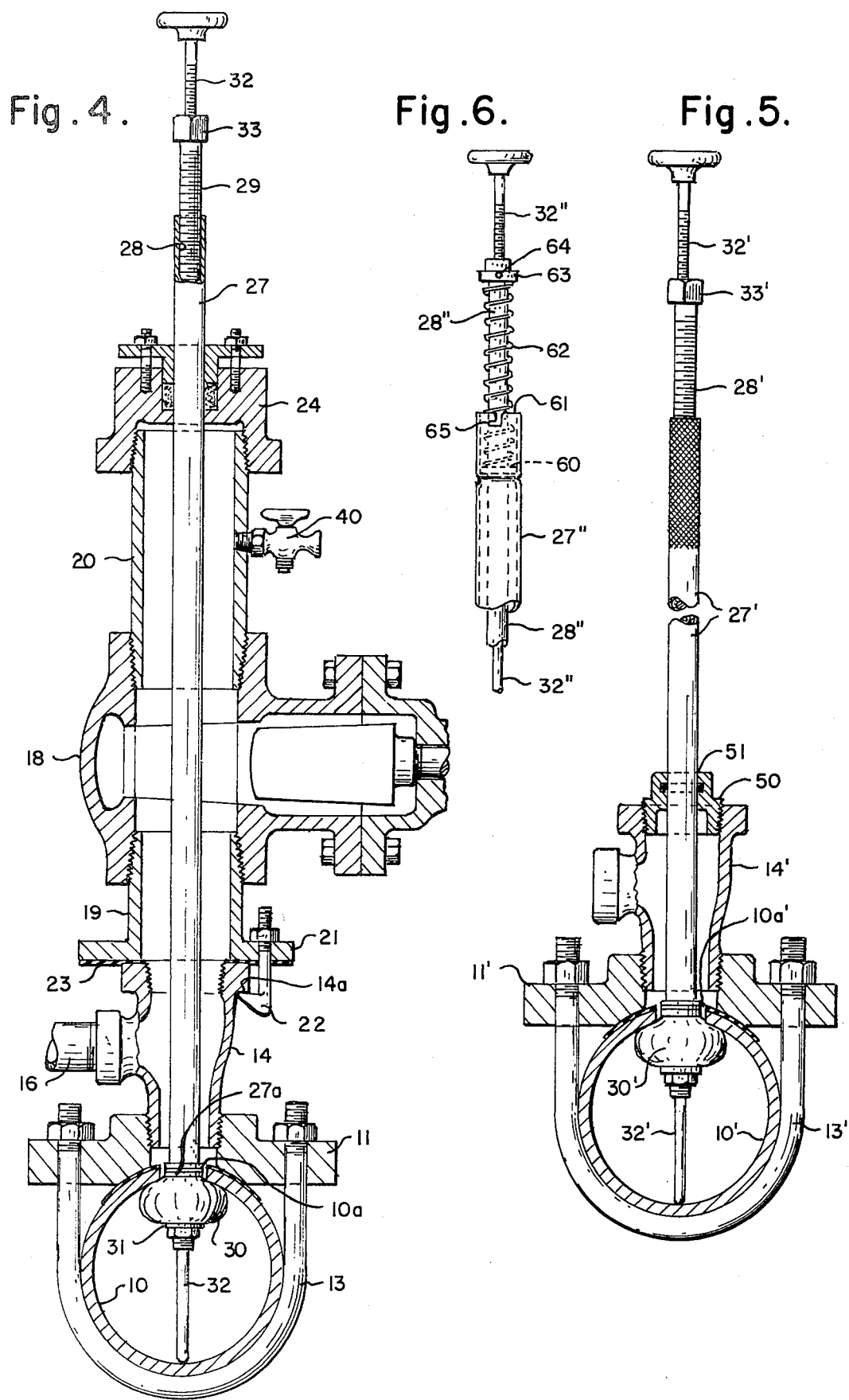

METHOD AND APPARATUS FOR STOPPING FLUID ESCAPE FROM PIPE MAINS

This invention relates to methods and apparatus for stopping fluid escape from pipe mains and particularly to an apparatus and method suitable for use in preventing fluid escape from lines containing dangerous or contaminating fluids during repairs or replacement of equipment connected to said lines.

One industry where the need for such equipment is necessary is the natural gas industry and the invention will be discussed in connection with its use in repair and replacement of equipment in natural gas lines.

The natural gas industry must periodically renew their service lines to customers because of corrosion, electrolysis, age, etc. This is a prime example of the situation in which the present invention finds utility. A service line, in the gas industry, generally consists of the service line itself, a service tee, a plug and a saddle on the main transmission line from which the service line originates. There are two types of pressure systems in general use by the gas industry; high pressure, consisting of those lines having gas pressures above 27 inches of water column and low pressure consisting of those lines with gas pressures below 27 inches of water column.

In replacing a service line following the practices of the prior art now in vogue in the gas industry, it must first be determined whether the gas line to be worked on is high or low pressure and whether the pressure can be regulated. While practically every system has some means for regulating pressure, there are situations where the pressure in the line cannot be reduced for practical reasons, e.g., in cold weather the pressure cannot be reduced because the line could not then adequately serve the customers connected thereto. If the system is a high pressure system and it can be regulated, the work crew must still await the convenience and availability of the regulator men. If the system cannot be regulated, then the employees removing the service line must perform the work using a fresh air gas mask. Moreover, many precautions must be taken and general inconvenience is involved. First, the flow of vehicular traffic in the area is stopped. This precaution is taken because the danger exists of possibly igniting the escaping gas. Secondly, the plug is removed and a rubber gum stopper is inserted into the throat of the service tee. As this gum stopper is compressed, it expands against the walls of the service tee and shuts off the flow of gas into the service line. The service line is then severed to facilitate the removal of the service tee from the saddle. When this is done, the rubber gum stopper will remain with the service tee. Next, the service tee is removed. With the service tee removed, the hole in the saddle where gas is escaping must be closed. This is done by inserting a steel plug into the opening. In order to install a new saddle, the old one must be removed and the main line must be filed and cleaned so that the seal of the new saddle will seat properly. When the old saddle is removed, a tapered wooden plug is inserted into the service line tap hole to prevent the gas from escaping while the main line is being cleaned as outlined above. When the new saddle is ready to be installed, the wooden plug is sawed flush with the main line. The new saddle is put in place over this wooden plug, the service tee is screwed into the saddle, and the new service lined is connected. To facilitate the flow of gas into the new service line, the wooden plug must be removed. This is accomplished by inserting a blunt steel rod through the service tee, striking the rod with a hammer, which pushes the wooden plug into the main line and allows the gas to flow into the service line. Finally, a steel plug is installed into the top of the service tee so that the escaping gas can be stopped. All this is slow and tedious and fraught with danger because of the high concentration of gas which develops in the area.

The present invention eliminates all of these problems and dangers and provides a simple solution to the problem of stopping fluid escape. The service line still consists of the same number of parts, assembled in the same way, but the manner of stopping the flow of gas is rapid and virtually without any significant amount of gas escaping. Fresh air gas masks are not necessary. It is not necessary to stop the flow of vehicular traffic in the area.

We preferably provide an apparatus for sealing the opening in the sidewall of a fluid carrying main during replacement of a service tee and/or saddle comprising a gate valve, means on one end of said gate valve for engaging the end of a service tee remote from the main, a plug wrench having an elongate stem adapted to pass through said gate valve in the open position, closure means on the other end of said gate valve having a passage adapted to sealingly and slidably pass said stem through the gate valve to remove a screw plug in the end of the service tee remote from the main, and to receive the screw plug and wrench above the gate valve while the gate valve is closed, a stopper rod having an axial passage interchangeable with the elongate stem of the plug wrench received in said passage in the closure means, said stopper rod having a resilient elongate plug on one end abutting said stopper rod, an intermediate hollow shaft threaded in the hollow passage of the stopper rod and extending through the resilient plug to expand the plug on relative rotation to the stopper, a threaded jack shaft extending through the hollow intermediate shaft in the stopper rod and through the resilient plug and threadingly engaging a stop on the resilient member whereby on relative rotation of the jack member and the stopper rod the expanded resilient plug is raised into engagement with the wall of the main around the opening therein to seal the same. Preferably, the means on one end of said gate valve for engaging the service tee is a flanged nipple, a gasket and a plurality of spaced J-bolts. The means on the other end of the gate valve is preferably a threaded nipple having a pipe cap with a central axial opening carrying seal means such as an O-ring.

In the foregoing general description, we have set out certain objects, purposes and advantages of our invention. Other objects, purposes and advantages of the invention will be apparent from a consideration of the following description and the accompanying drawings in which:

FIG. 4 is a fragmentary section showing the seal in place in the hole in the main;

FIG. 5 is a fragmentary section showing a modification of the stopper rod for use in low pressure gas lines; and FIG. 6 is a fragmentary side elevational view of second embodiment of apparatus for low pressure gas lines.

Figure 2:
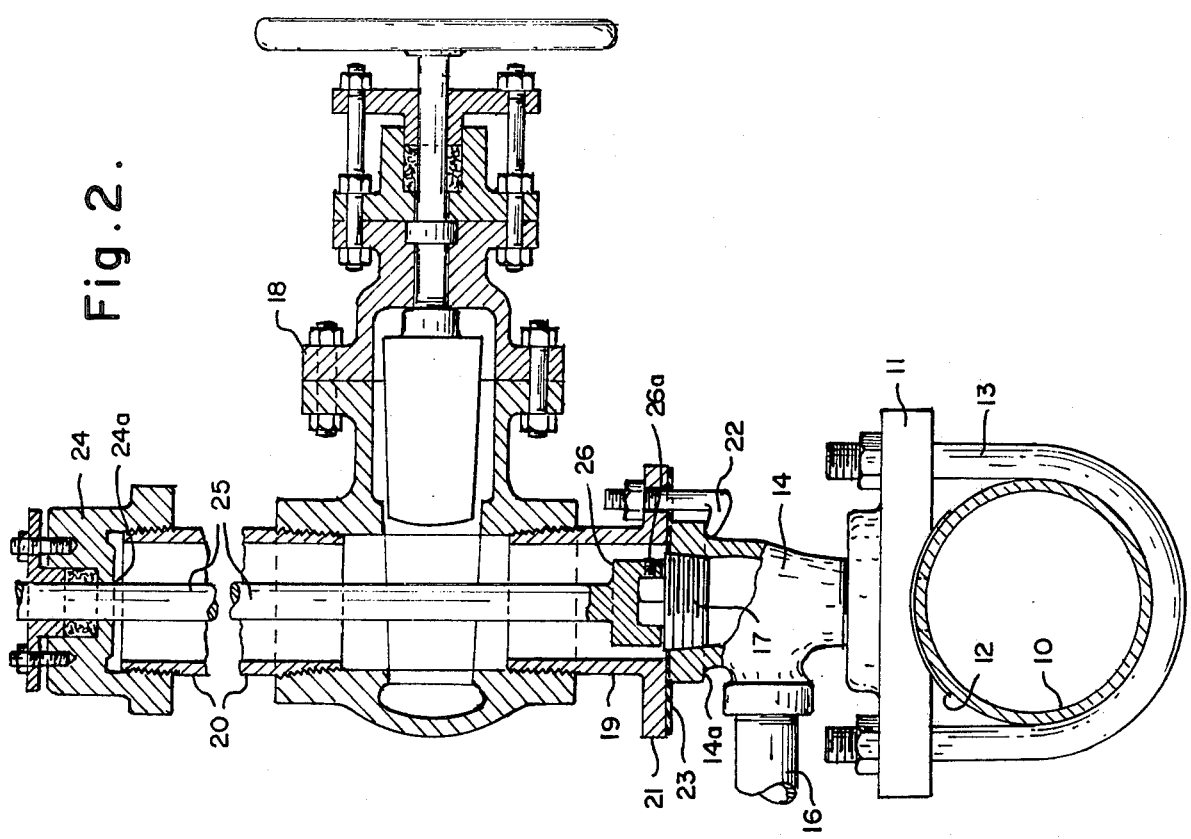
FIG. 2 is a fragmentary section showing the plug wrench in place for removal of the pipe plug in the service tee.

Referring to the drawings, we have illustrated a gas main 10 having a saddle 11 held in place on gasket 12 by U-bolts 13. A service tee 14 is threaded into the opening 15 in saddle 11 in the usual manner and has a service line 16 connected to the side arm of the tee. A pipe plug 17 is inserted in the opposite leg of the tee. This is a conventional service line assembly.

The present invention provides a gate valve 18 having nipples 19 and 20 at its opposite ends. Nipple 19 carries a flange 21 and J-bolts 22 whose ends are adapted to engage beneath the shoulder 14a on the service tee 14. A gasket 23 is provided between the flange 21 and the shoulder 14a of the service tee to form a seal. The opposite nipple 20 is provided with a pipe cap 24 having an axial passage or hole 24a. The hole 24a may be simply a snug slip fit or it may be fitted with an O-ring to seal against the stem 25 of plug wrench 26 and the outter hollow stopper rod 27 of the plug assembly. The plug wrench 26 is provided with a set screw 26a to fix it firmly on the head of plug 17 so that plug 17 can be lifted by the plug wrench as hereafter described. The stopper rod 27 is provided with a threaded nut or portion 28 into which an intermediate hollow shaft 29 is threaded. Shaft 29 passes through the hollow axis of stopper rod 27 and through a hollow rubber cylinder 30 at the end of rod 27. A flange ring 31 is fixed to the end of shaft 29 and bears against the bottom of rubber cylinder 30. A flange ring 27a fixed to stopper rod 27 bears against the opposite end of rubber cylinder 30 so that relative rotation of shaft 29 and rod 27 which causes the flange rings 31 and 27a to move together will compress and expand rubber cylinder 30 to a donut shape. An inner jack screw 32 is threaded through nut 33 fixed to the top end of shaft 29 so that after the cylinder 30 is expanded to donut shape within main 10, rotation of jack screw 32 will move it through nut 33 into contact with the bottom of main 10 to raise the donut 30 upwardly into tight sealing engagement with the hole 10a in main 10 to seal it against leakage.

The operation of the device is as follows. The flange 21 is placed on the collar 14a of service tee 14 with gasket 23 in place between them and the J-bolts 22 are tightened to fix the flange in place. The pipe plug 17 is loosened with a wrench and the plug wrench 26 is placed on the head of plug 17 and set screw 26a is tightened so that the plug 17 is held in wrench 26. The assembly of nipple 19, gate valve 18 (in the open condition) nipple 20 and cap 24 are slid down over stem 25 of plug wrench 26 and nipple 19 is threaded into flange 21. The apparatus is now in condition to renew the service line. First plug 17 on service tee 14 is screwed out by turning plug wrench 26 counter-clockwise and is then pulled up through gate valve 18 into the enclosure formed by nipple 20. The control gate valve 18 is closed, and the plug, plug remover, and the enclosure cap 24 are taken off. By removing the plug 17 we can now gain entry into the main line 10 through the service tee 14.

The enclosure cap 24 is drawn over the stopper rod 27 and screwed onto the enclosure nipple 20 with the rubber cylinder 30 in the nipple. Opening the gate valve 18 allows the stopper rod 27 to be pushed down through the service tee 14 and into the main line 10. Turning the outer stopper rod 27 clockwise around the intermediate shaft 29 causes the rubber cylinder 30 to be compressed changing its cylindrical shape to a round donut shape. The inner threaded rod 32 is screwed downward bearing against the bottom of the main causing the donut shaped gasket 30 to rise and completely seal the hole 10a (See FIG. 4). The sealing effect can be checked by opening a pet cock 40 located on the side of the enclosure nipple 20. A unique advantage of the apparatus here described is that it does not matter whether the tap hole 10a is square or round, because the rubber gasket 30 will confrom to either. When a complete seal is attained, the enclosure nipple 20 and cap 24, control gate valve 18, nipple 19 and flange clamp assembly 21, 22 are removed, leaving the stopper rod assembly in place. The service tee 14 and saddle 11 are removed and the main line 10 is cleaned in preparation to receive the new saddle. The new saddle 11 is drawn over the stopper rod assembly and tightened to the main line 10. The service tee 14 is then drawn over the stopper rod assembly and screwed into the saddle 11. Then the flange clamp 21 is attached to the service tee 14, the nipple 19 is screwed into flange clamp 21, 22 along with the control gate valve 18, and the enclosure nipple 20 and cap 24. Turning the inner threaded rod 32 of the stopper rod assembly counter-clockwise, the donut shaped gasket 30 begins to drop into the main line 10 and allows the gas to flow into the new service line. The intermediate rod 29 is then turned clockwise in stopper rod 27 and the donut shaped gasket 30 returns to its original cylindrical shape. The stopper rod assembly 27 is then pulled up through the service tee 14 and above the control gate valve 18, and into the enclosure nipple 20. The control gate valve 18 is closed, and the enclosure cap 24 and the stopper rod assembly is removed. The plug wrench now becomes a plug installer and is inserted in cap 24 which is placed on nipple 20 with plug 17 enclosed in the enclosure nipple 20. The gate valve 18 is opened and the plug installer is pushed down to the opening of the service tee 14 and the plug 17 is screwed into place. All parts of the tool are then removed from the service tee and the job is completed.

Figure 1:
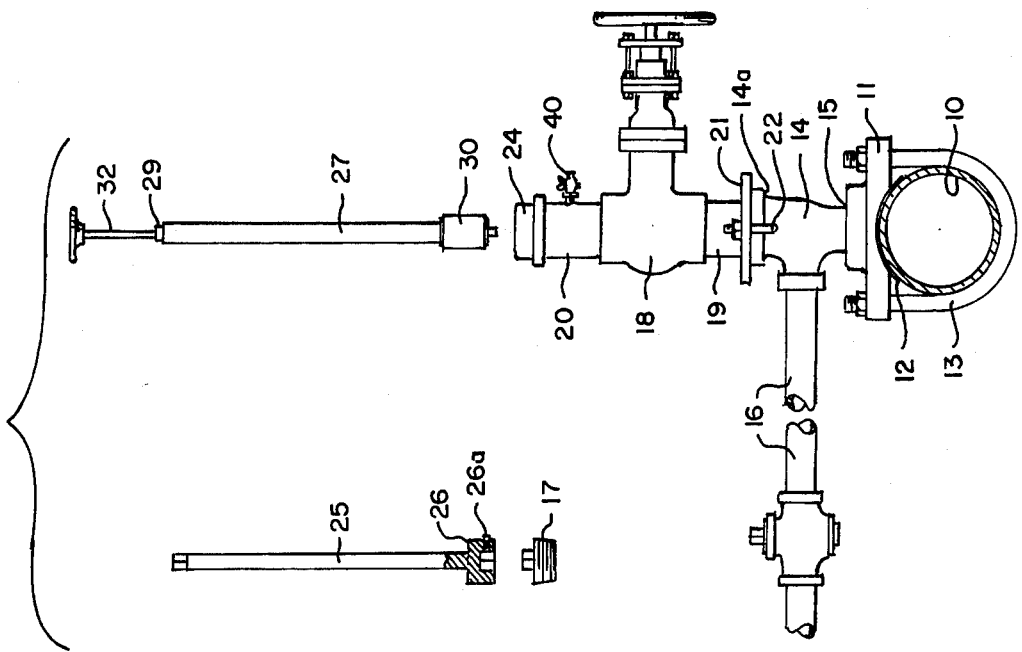
FIG. 1 is a side elevational view of the apparatus of this invention, partially assembled on a service tee.
Figure 3:
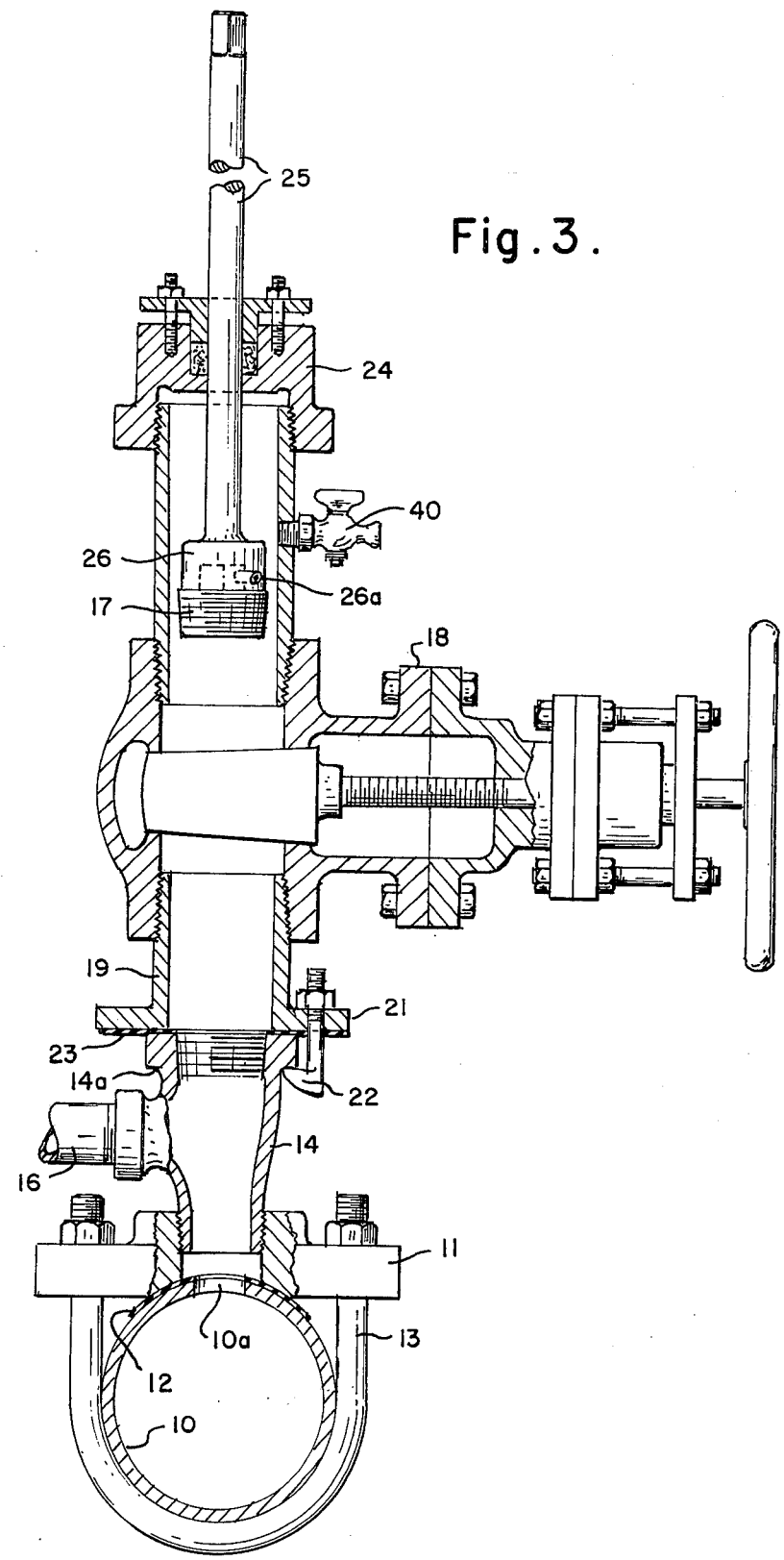
FIG. 3 is a fragmentary section showing the plug wrench above the gate valve with the gate valve closed.

In FIG. 5, we have illustrated a modification of the stopper rod assembly for use on low pressure lines where it is not necessary to use a gate valve because of the low volume of gas which escapes during the changeover. In this assembly, like parts are given like numbers with a prime sign. The difference is that a pipe plug 50 having an opening 51 adapted to slidably receive stopper rod 27' is substituted for cap 24 of the assembly of FIG. 1. In use the pipe plug 17' is simply removed with a pipe wrench and the pipe plug 50 carrying stopper rod assembly 27' is inserted in its place. The resilient cylinder 30' is pushed down into main 10', the rod 27' and the intermediate rod 28' are relatively rotated to expand rubber plug 30' into donut shape and inner rod 32' is screwed down into contact with the bottom of main 10' to elevate the donut 30' into the opening 10a' of the pipe being sealed. The service tee 14' and saddle 11' are then removed as in FIGS. 1–4 and replaced and the stopper rod removed by reversing the procedure.

In FIG. 6, we have illustrated a modification of the apparatus of FIG. 5 for use in low pressure gas lines. In this assembly, parts which are the same as those in FIG. 5 are given like numbers with a double prime sign. This embodiment differs from that of FIG. 5 in that stopper rod 27" is provided with an inner radial stop 60 forming a well 61 receiving a spring 62 which bears at one end on stop 60 and at the other end on flange 63 on the upper end of intermediate rod 28". The flange 63 is adapted to slide into well 61 and is provided with radially extending pins 64 which fit into an L-shaped locking slot 65 in the wall of well 61. Thus, when intermediate rod 28" is pushed downwardly into stopper rod 27" and pins 64 are locked in slot 65 the rubber cylinder 30' (FIG. 5) is in its normal cylindrical shape. When the pins 64 are released from slot 65, the spring 62 pushes intermediate rod upwardly expanding rubber cylinder 30' into an ovoid condition as shown in FIG. 5 after which jack screw 32" is operated to push the expanded cylinder 30' into sealing engagement with an opening in a pipe to be sealed as shown in FIG. 5.

In the foregoing specification, we have set out certain preferred practices and embodiments of our invention, however, it will be understood that this invention may be otherwise embodied with the scope of the following claims.

We claim:

1. An apparatus for sealing the opening in the sidewall of a fluid carrying main during replacement of a service tee or the like connected thereto comprising a gate valve, means on end of said gate valve for engaging the end of a service tee remote from the main, a plug wrench having an elongate stem adapted to pass through said gate valve in the open position, closure means on the other end of said gate valve having a passage adapted to sealingly and slidably pass said stem through the gate valve to remove a screw plug in the end of the service tee remote from the main and to receive the screw plug and wrench above the gate valve while the gate valve is closed, a stopper rod interchangeable with the elongate stem of the plug wrench in the passage in the closure means, said stopper rod having an axial passage, a resilient elongate member having one end abutting one end of said stopper rod, an intermediate hollow shaft threaded in the hollow passage of the stopper rod and extending through and abutting the other end of the resilient member to expand the resilient member radially on relative rotation with respect to the stopper rod, a threaded jack shaft extending through and threadingly engaging the hollow intermediate shaft and bearing on the side of the main opposite the opening, the expanded resilient member being raised into engagement with the wall of the main around the opening therein to seal the same on relative rotation of the jack member and the stopper rod with the jack shaft bearing on the side of the main to hold it firmly in place.

2. An apparatus as claimed in claim 1 wherein the means on said one end of the gate valve for engaging the service tee is a flanged nipple, a gasket between the flanged nipple and service tee and a plurality of spaced J-bolts in the flanged nipple adapted to engage and hold the service tee.

3. An apparatus as claimed in claim 1 wherein the closure means on the other end of said gate valve is a threaded nipple adapted to have one end threaded into said gate valve and pipe cap means threaded on the other end, said pipe cap means having an axial passage slidably receiving interchangeably the plug wrench stem and stopper rod.

4. An apparatus as claimed in claim 3 wherein the passage in the pipe cap means is provided with a resilient seal means.

5. An apparatus as claimed in claim 4 wherein the resilient seal means is a rubber O-ring.

6. An apparatus as claimed in claim 1 wherein the resilient elongate member is a rubber cylinder having an axial passage receiving the intermediate shaft.

7. An apparatus as claimed in claim 1 wherein the plug wrench includes means for holding the plug within the wrench after removal.

8. An apparatus for sealing the opening in the sidewall of a low pressure fluid carrying main during replacement of a service tee or the like connected thereto comprising a stopper rod, a closure means having a passage adapted to sealingly and slidably pass said stopper rod, said closure means adapted to engage the service tee on removal of a plug therefrom, said stopper rod having an axial passage therethrough, a resilient elongate member having one end abutting one end of said stopper rod, an intermediate hollow shaft threaded in the hollow passage of the stopper rod and extending through and abutting the other end of the resilient member to expand the resilient member radially on relative rotation with respect to the stopper rod, a threaded jack shaft extending through and threadingly engaging the hollow intermediate shaft and bearing on the side of the main opposite the opening, the expanded resilient member being raised into engagement with the wall of the main around the opening therein to seal the same on relative rotation of the jack member and the stopper rod, with the jack shaft bearing on the side of the main to hold it firmly in place.

9. An apparatus as claimed in claim 8 wherein the resilient elongate member is a rubber cylinder having an axial passage receiving the intermediate shaft.

10. An apparatus as claimed in claim 8 wherein the closure means is a pipe plug having an axial passage therein.

11. A method of sealing the opening in the sidewall of a fluid carrying main during replacement of a service tee or the like having a removable plug aligned with the opening in the sidewall comprising the steps of:
 (a) fixing a wrench on said plug having an elongate axial stem,
 (b) placing a gate valve over said wrench and fixing said valve to said service tee,
 (c) fixing an enclosure to the gate valve opposite the service tee having a passage sealingly and slideably receiving the stem of the wrench,
 (d) removing the plug and raising it through the gate valve into said enclosure,
 (e) closing the gate valve,
 (f) removing the enclosure and wrench from the gate valve,
 (g) a resilient elongate member having one end abutting one end of the stopper rod, an intermediate hollow shaft threaded in the stopper rod and extending through and abutting the other end of the resilient member to expand it, and a threaded jack means extending through and threadingly engaging the intermediate hollow shaft, said jack means bearing on the side of the main opposite the opening,
 (h) fixing said enclosure on the gate valve,
 (i) opening the gate valve and inserting the expandable member and jack means through the gate valve and opening in the main into the interior of the main, with the jack means bearing on the side of the main opposite the opening, (j) expanding the resilient member to a diameter greater than the opening in the main by rotating the intermediate hollow shaft relative to the stopper rod (k) raising the expanded resilient member radially by rotating the jack means relative to the intermediate hollow shaft into tight sealing contact with the walls of the main around the opening with the jack means bearing on the side of the main opposite the opening, and (l) removing the gate valve, enclosure and service tee from around the stopper rod.

12. A method of sealing the opening in the sidewall of a fluid carrying main comprising the steps of:

(a) inserting one end of a stopper rod having an expandable resilient member, said expandable resilient member having one end abutting one end of the stopper rod, an intermediate hollow shaft threaded in the stopper rod and extending through and abutting the other end of the resilient member to expand it, and a threaded jack means extending through and threadingly engaging the intermediate hollow shaft, said jack means bearing on the side of the main opposite the opening, (b) expanding the resilient member to a diameter greater than the opening by rotating the intermediate hollow shaft relative to the stopper rod, and (c) raising the expanded resilient member radially by rotating said jack means relative to the intermediate hollow shaft into tight contact with the wall of the main around the hole therein to seal the same with the jack means bearing on the side of the main opposite the opening.

* * * * *

UNITED STATES PATENT AND TRADEMARK OFFICE
CERTIFICATE OF CORRECTION

PATENT NO. : 4,127,141

DATED : November 28, 1978

INVENTOR(S) : Alfred D. LeDonne and George A. Scheuering

It is certified that error appears in the above-identified patent and that said Letters Patent are hereby corrected as shown below:

The name of the first inventor should be corrected to read "Alfred D. LeDonne"

On the Title Page, under "References Cited", "Racj" should read --Ray--.

Claim 11, column 6, after "(g)", --inserting a stopper rod assembly,-- should be inserted before "a resilient...".

Signed and Sealed this

Tenth Day of April 1979

[SEAL]

Attest:

RUTH C. MASON
Attesting Officer

DONALD W. BANNER
Commissioner of Patents and Trademarks